US009855873B2

(12) United States Patent
Yamane et al.

(10) Patent No.: US 9,855,873 B2
(45) Date of Patent: Jan. 2, 2018

(54) HEAD REST

(71) Applicant: BIZEN HATSUJO CO., LTD., Okayama-shi, Okayama (JP)

(72) Inventors: Takeshi Yamane, Okayama (JP); Tokuzo Kobayashi, Okayama (JP); Yasushi Taniguchi, Okayama (JP)

(73) Assignee: BIZEN HATSUJO CO., LTD., Okayama-shi (JP)

( * ) Notice: Subject to any disclaimer, the term of this patent is extended or adjusted under 35 U.S.C. 154(b) by 32 days.

(21) Appl. No.: 15/132,721

(22) Filed: Apr. 19, 2016

(65) Prior Publication Data
US 2016/0332547 A1    Nov. 17, 2016

(30) Foreign Application Priority Data
May 14, 2015   (JP) ................................. 2015-098907

(51) Int. Cl.
*A47C 1/10*        (2006.01)
*B60N 2/48*        (2006.01)

(52) U.S. Cl.
CPC ......... *B60N 2/4841* (2013.01); *B60N 2/4838* (2013.01); *B60N 2/4847* (2013.01); *B60N 2002/4888* (2013.01)

(58) Field of Classification Search
CPC .. A61G 15/125; B60N 2/4841; B60N 2/4838; B60N 2/4847; B64D 11/0642
USPC ........................................ 297/408, 391, 409
See application file for complete search history.

(56) References Cited

U.S. PATENT DOCUMENTS

| | | | | |
|---|---|---|---|---|
| 4,674,792 A * | 6/1987 | Tamura | ................ | B60N 2/4847 297/408 |
| 4,733,913 A * | 3/1988 | Tateyama | ............. | B60N 2/4864 297/356 |
| 6,045,181 A * | 4/2000 | Ikeda | ................... | B60N 2/4847 297/216.12 |
| 6,499,805 B1 * | 12/2002 | Watadani | ............. | B60N 2/4808 297/391 |

(Continued)

FOREIGN PATENT DOCUMENTS

| | | |
|---|---|---|
| JP | 2005-177227 A | 7/2005 |
| JP | 2006-523497 A | 10/2006 |

(Continued)

*Primary Examiner* — Jose V Chen
(74) *Attorney, Agent, or Firm* — Fox Rothschild LLP

(57) ABSTRACT

A headrest with a lock urging member in which unintentional change in an urging direction will hardly occur is provided. The headrest includes a first member, a second member, a backward urging member, a lock plate, a lock urging member, a lock switching member, and a resistance member. The lock switching member is provided with a switching pin abutment portion A, a switching pin abutment portion B, and a switching cam abutment portion. The lock plate includes a switching cam abutted portion. In a lock adjustment range, the lock switching member is moved together with the second member by the resistance member configured to apply resistance to movement of the lock switching member with respect to the second member. In addition, in rotation further forward beyond a forward adjustment limit position, the switching abutment portion B abuts against the switching pin fixed to the first member, so that the lock switching member does not follow the second member, whereby the headrest is unlocked.

3 Claims, 14 Drawing Sheets

(56) References Cited

U.S. PATENT DOCUMENTS

| | | | |
|---|---|---|---|
| 2007/0013219 A1 | 1/2007 | Chung | |
| 2009/0152924 A1* | 6/2009 | Kim | B60N 2/4855 |
| | | | 297/408 |
| 2013/0234491 A1* | 9/2013 | Schmitz | B60N 2/4841 |
| | | | 297/391 |
| 2014/0265507 A1* | 9/2014 | Fredriksson | B60N 2/4841 |
| | | | 297/408 |
| 2015/0266402 A1* | 9/2015 | Lutzka | B60N 2/4855 |
| | | | 297/61 |
| 2015/0306995 A1* | 10/2015 | Tachikawa | B60N 2/4844 |
| | | | 297/408 |
| 2015/0366353 A1* | 12/2015 | Jeong, II | A47C 7/38 |
| | | | 297/408 |
| 2015/0375649 A1* | 12/2015 | Jeong, II | A47C 7/38 |
| | | | 297/391 |
| 2017/0182916 A1* | 6/2017 | Yamane | B60N 2/4855 |

FOREIGN PATENT DOCUMENTS

| | | |
|---|---|---|
| JP | 5710831 B | 4/2015 |
| WO | 2014/073249 A1 | 5/2014 |

* cited by examiner

Initial Position

Forward Adjustment Limit Position

Forward Rotation Limit Position

Position Abutting Against Switching Abutment Portion A

HEAD REST

BACKGROUND OF THE INVENTION

1. Field of the Invention

The present invention relates to a headrest with an adjustable front-back position.

2. Description of the Related Art

As a headrest mounted on an upper portion of a seat back of an automobile or the like, a headrest is known with a structure in which a headrest frame is supported by a headrest stay with a variable support mechanism such as a link mechanism, and the position of the headrest frame for the headrest stay can be locked with a lock mechanism, to make the front-back position of the headrest adjustable as disclosed in WO2014/073249A1 or JP2006-5234987A.

In the headrests disclosed in WO2014/073249A1 and JP2006-5234987A, a plurality of engaging teeth are formed in a member included in the variable support mechanism, and the front-back position of the headrest is adjustable by changing the engaging teeth to be engaged with engaging projections formed in a lock plate included in the lock mechanism. For example, in the headrest disclosed in WO2014/073249A1, a portion corresponding to the engaging teeth is formed in "front link member 20" in FIG. 1 of WO2014/073249A1, and a portion corresponding to the engaging projection is formed in "lock plate 50" in FIG. 1. By contrast, in the headrest disclosed in JP2006-5234987A, a portion corresponding to the engaging teeth is formed in "gear portions 116" in FIG. 5 of JP2006-5234987A, and a portion corresponding to the engaging projections is formed in "pivotable gears 120" in FIG. 5.

In addition, the headrests of WO2014/073249A1 and JP2006-5234987A each include a lock urging member to urge the lock plate in a lock direction (a direction in which the engaging projections are engaged with the engaging teeth, the same is applicable hereinafter), to prevent the engaging projections from falling out of the engaging teeth when it is in the used position. For example, in the headrest disclosed in WO2014/073249A1, "get-over spring 60" in FIG. 1 of WO2014/073249A1 corresponds to the lock urging member. In the headrest of JP2006-5234987A, "second torsion coil spring 121" in FIG. 5 of JP2006-5234987A corresponds to the lock urging member.

In addition, in the headrests of WO2014/073249A1 and JP2006-5234987A, the urging direction of the lock plate by the lock urging member is set to the lock direction when the headrest is in the used position (lock state), and set to the unlock direction (direction in which the engaging projections are not engaged with the engaging teeth, the same is applicable hereinafter) when the headrest is not in the used position (in an unlock state). Specifically, the headrests adopt the structure in which the urging direction of the lock urging member is switched between the lock state and the unlock state (see paragraphs 0032 and 0033 of WO2014/073249A1).

However, as described above, the structure of switching the urging direction of the lock urging member requires high accuracy for setting the sizes, shapes, and arrangement of the lock urging member and the members on which the lock urging member acts. For this reason, in the headrests disclosed in WO2014/073249A1 and JP2006-5234987A, the urging direction of the lock urging member may be switched not only when the user operates the headrest, but also when the headrest is vibrated due to an impact caused when the tire of the automobile runs over a difference in level on the road surface. Accordingly, there is the possibility that engagement between the engaging teeth and the engaging projections is released although the headrest is in the used position, or the engaging teeth and the engaging projections are locked although the headrest is not in the used position.

SUMMARY OF THE INVENTION

The present invention has been made to solve the above problem and is aimed at providing a headrest with excellent safety, in which the urging direction of the lock urging member is not easily switched when the headrest is not operated.

A solution is provided as follows:

a headrest in which a headrest frame is rotatably supported with respect to a headrest stay to make a front-back position adjustable, including:

a first member including a pair of right and left vertical wall portions each having an upper edge provided with a plurality of engaging teeth, a bottom plate portion connecting the pair of right and left vertical wall portions, and a switching pin fixed to the vertical wall portions, the first member being integrally coupled with the headrest stay;

a second member pin-connected to a third member or integrally coupled with the headrest frame, the third member being integrally coupled with the headrest frame;

a backward urging member configured to urge the second member to rotate the second member backward;

a lock plate provided at a lower edge with a pair of right and left engaging projections to be engaged with the engaging teeth, the lock plate being supported in a rotatable state with respect to the second member;

a lock urging member configured to constantly urge the lock plate in a lock direction, to cause the lock plate to follow the second member;

a lock switching member provided with a first engaging groove and a second engaging groove, and attached in a rotatable or slidable state to the second member; and a resistance member configured to apply resistance to movement of the lock switching member with respect to the second member by engaging with the first engaging groove or the second engaging groove, in which the lock switching member is provided with a switching abutment portion A, a switching abutment portion B, and a switching cam abutment portion, the lock plate includes a switching cam abutted portion, in a lock adjustment range, in a state in which the switching abutment portion A is not regulated by the switching pin, the resistance member is engaged with the first engaging groove to apply resistance to rotation or slide of the lock switching member with respect to the second member, and the lock switching member is moved together with the second member, and in rotation further forward beyond a forward adjustment limit position, the switching abutment portion B abuts against the switching pin to regulate rotation or slide of the lock switching member, the second member is rotated forward without accompanying rotation of the lock switching member, while the switching cam abutted portion abuts against and runs onto the switching cam abutment portion, to change relative positional relation (angle relation) between the second member and the lock plate, the resistance member is engaged with the second engaging groove, the headrest is unlocked by rotation of the lock plate in an unlock direction, returned to an initial position by the backward urging member, and returns to an original state by regulation of movement of the lock switching member.

As described above, providing the lock switching member removes necessity for switching the urging direction of the lock urging member between the lock state and the unlock state. This structure prevents occurrence of malfunctions, such as unlocking between the engaging tooth and the engaging projection although the headrest is in the used position, and locking between the engaging tooth and the engaging projection although the headrest is not in the used position (lock adjustment range), due to vibrations occurring in the headrest.

The headrest of the present invention also preferably includes:

a resin cover containing, together with the headrest frame, a mechanism member including a variable support mechanism (the first member, the second member, and the backward urging member), a lock mechanism (the lock plate and the lock urging member), and a lock switching mechanism (the lock switching member and the resistance member), in which the resin cover is dividable and includes a left resin cover assembled from a left side (left side as the headrest is viewed from the rear, the same is applicable hereinafter) of the headrest frame, and a right resin cover assembled from a right side (right side as the headrest is viewed from the rear, the same is applicable hereinafter) of the headrest frame, the headrest frame is formed of a steel wire material in a bridge shape (a shape like a torii in a Japanese shrine) having right and left support portions and an upper portion extending rightward and leftward, and integrally coupled with a rotating side portion at the support portions, the left resin cover and the right resin cover covering the mechanism member are integrally coupled in a form of wrapping the headrest frame, and at least one of the left resin cover and the right resin cover includes a stopper hook abutting against the headrest frame contained therein from the left or right to prevent the headrest frame from falling off.

This structure protects the variable support mechanism and the lock mechanism with the resin cover, and securely fixes the resin cover on the headrest frame such that the resin cover is not disengaged from the headrest frame. This structure enables marked material saving and reduction in weight of the resin cover, with the strength secured.

The headrest of the present invention also preferably includes:

a resin cover containing, together with the headrest frame, a variable support mechanism (the first member, the second member, and the backward urging member), a lock mechanism (the lock plate and the lock urging member), and a lock switching mechanism (the lock switching member and the resistance member);

a cover forming an outer surface of the headrest; and a cushion material disposed between an external surface of the resin cover and an internal surface of the cover, in which the resin cover is dividable and includes a left resin cover assembled with the headrest frame from a left side, a right resin cover assembled with the headrest frame from a right side, and a lower resin cover assembled with the headrest frame from a lower side.

This structure facilitates manufacturing and mutually assembling the variable support mechanism, the lock mechanism, and the lock switching member in the headrest in one factory, and bringing the assembled intermediate product into another factory to integrate the product with the cover and the cushion material in the factory. This structure also enhances flexibility in selection of the place for manufacturing the headrest, for example, in the other factory, the manufacturer can adopt either a method of pouring the cushion material such as urethane foam into a space between the internal surface of the cover and the external surface of the resin cover in a state where the intermediate product is contained in the cover, or a method of inserting the intermediate product into a hollow portion of the cushion material molded in advance in the internal surface of the cover.

As described above, the present invention provides a headrest that has the structure in which the urging direction of the lock urging member is not easily switched when the headrest is not operated, has excellent safety, and enables material saving and reduction in weight.

DETAILED DESCRIPTION OF THE PREFERRED EMBODIMENTS

Preferred embodiments of the headrest of the present invention will be explained hereinafter more specifically with reference to drawings. In the following explanation, the headrest of the present invention will be described with two embodiments, that is, a first embodiment and a second embodiment, as examples. However, the technical range of the headrest of the present invention is not limited to these embodiments, but proper changes may be made within a range not spoiling the gist of the invention.

1.1 Headrest of First Embodiment

Figure 1:
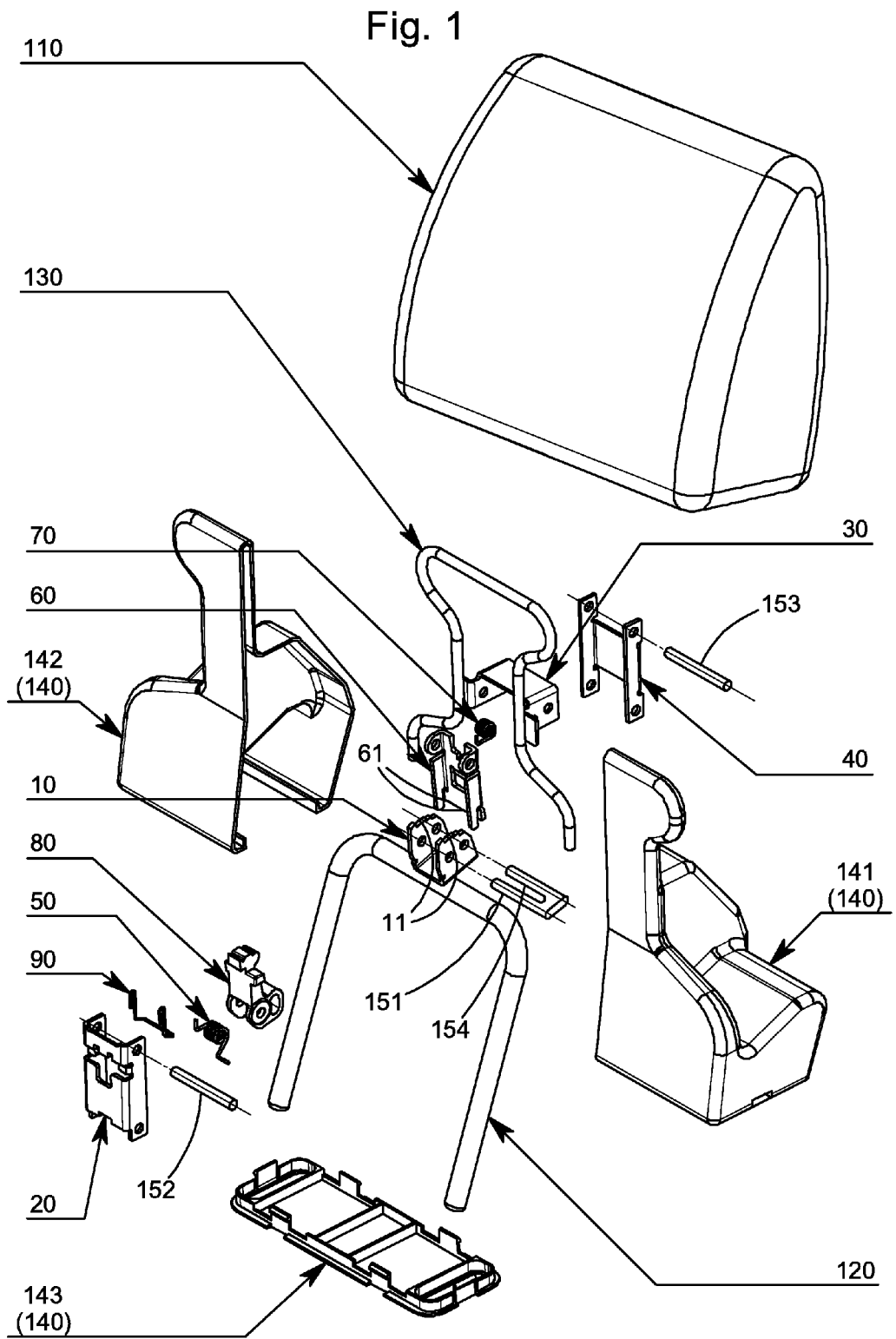
FIG. 1 is a front perspective view illustrating a headrest according to a first embodiment in an exploded state.
Figure 2:
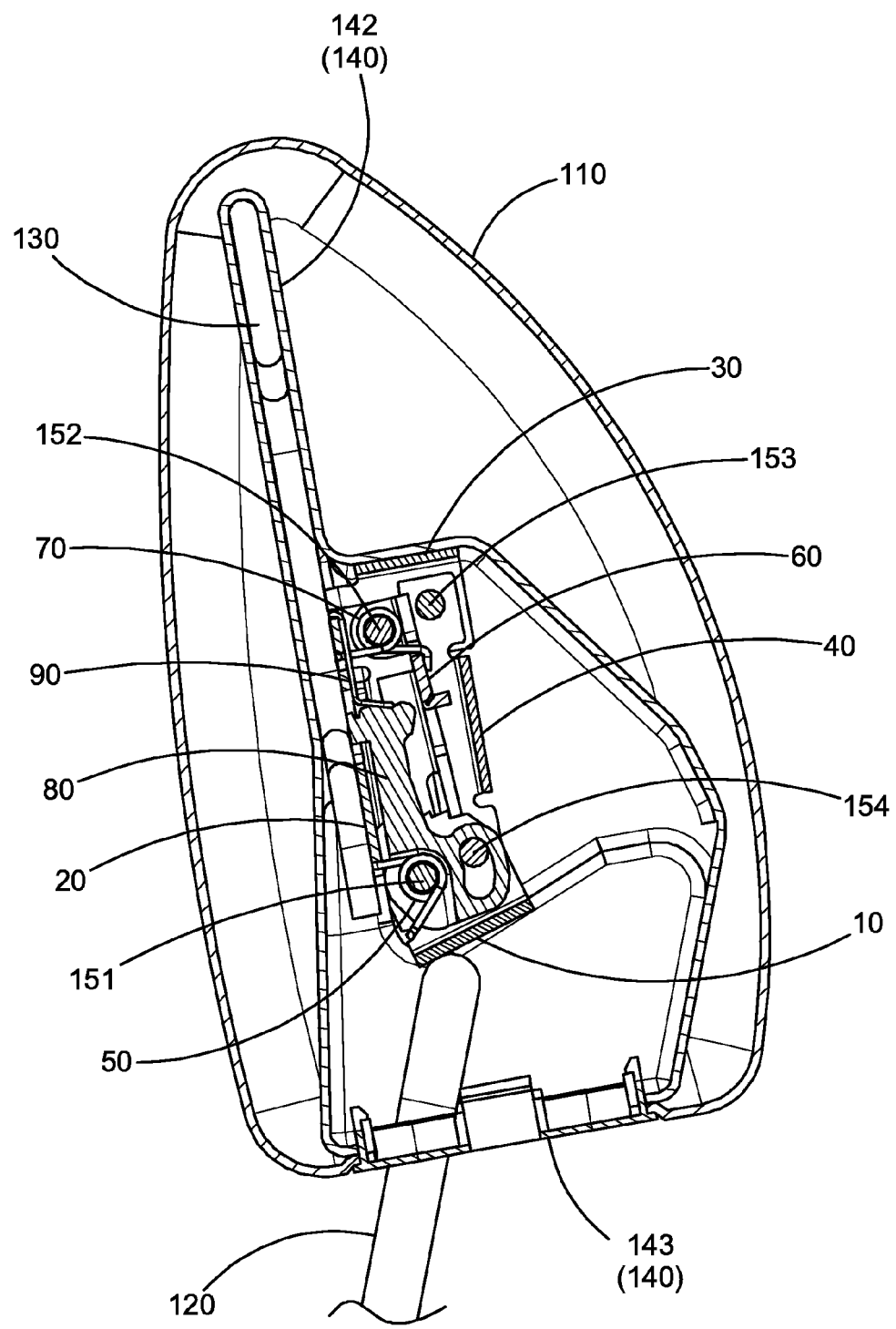
FIG. 2 is a sectional view illustrating a state where the headrest according to the first embodiment is cut with a vertical plane extending through the center thereof.
Figure 3A:
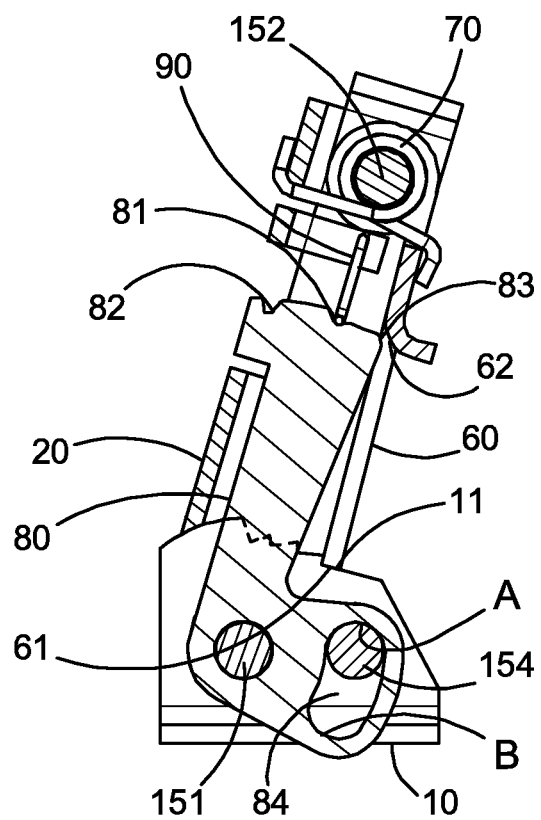
FIG. 3(a), FIG. 3(b), FIG. 3(c), and FIG. 3(d) are explanatory drawings illustrating the operations of a lock switching member in the headrest according to the first embodiment.
Figure 3B:
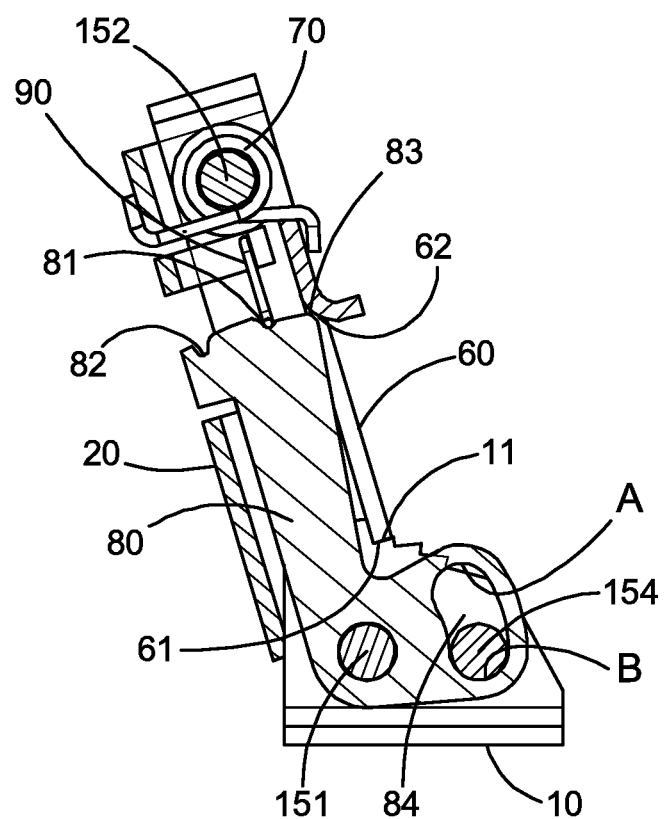
Figure 3C:
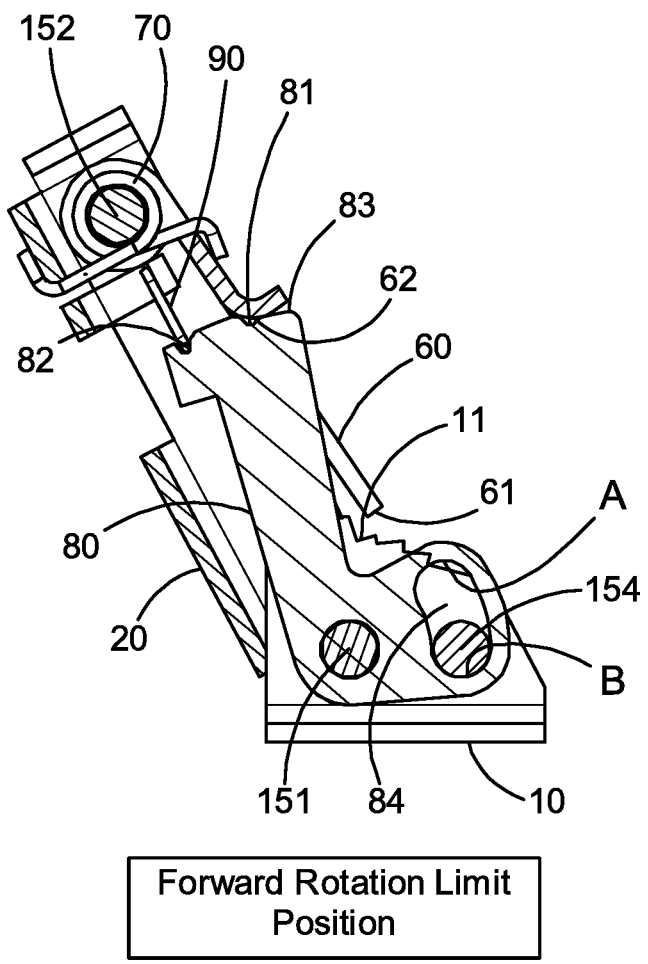
Figure 3D:
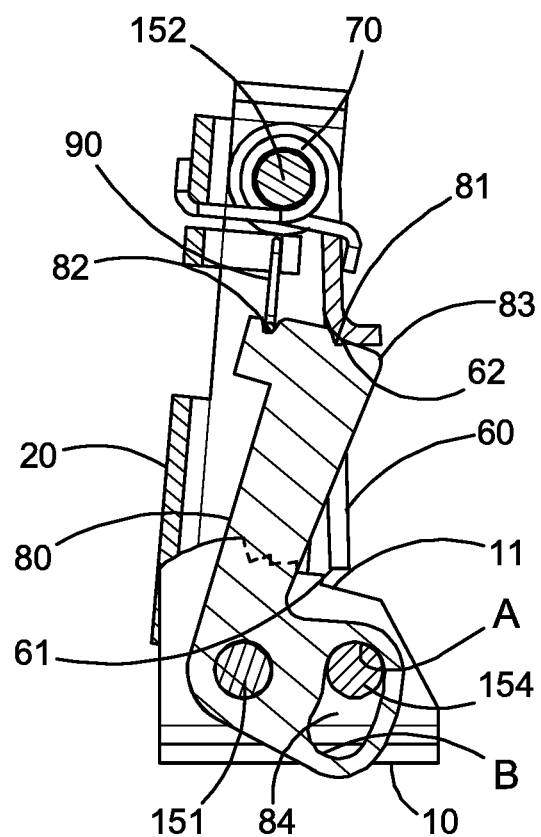
Figure 4:
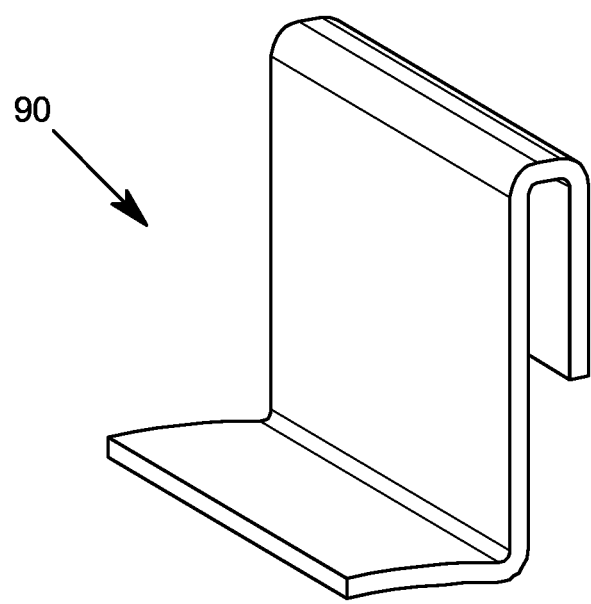
FIG. 4 is a rear perspective view of a resistance member of another mode in the headrest according to the first embodiment.
Figure 5A:
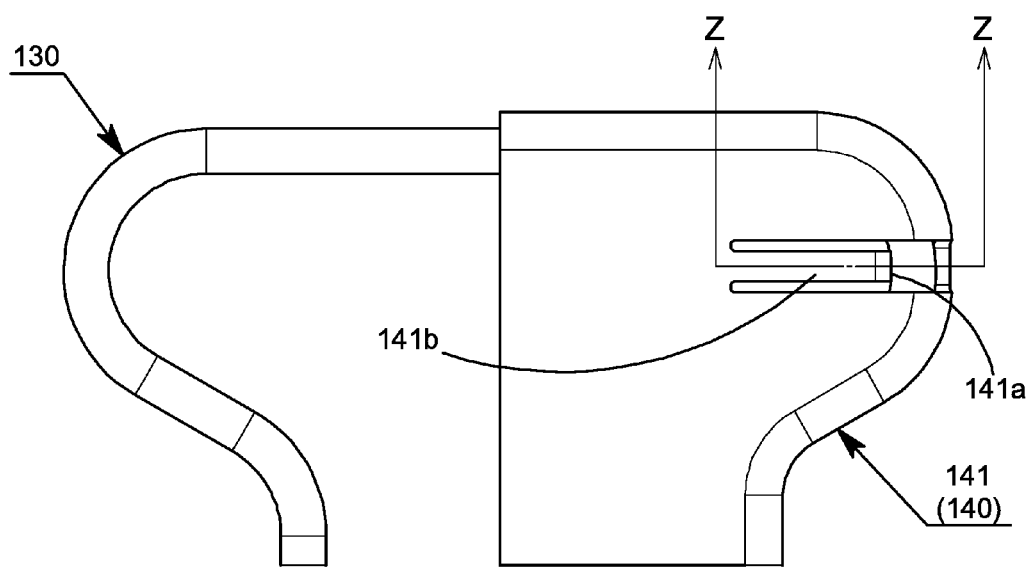
FIG. 5(a) and FIG. 5(b) are diagrams illustrating a headrest frame in a state where a left resin cover is mounted thereon in the headrest according to the first embodiment.
Figure 5B:
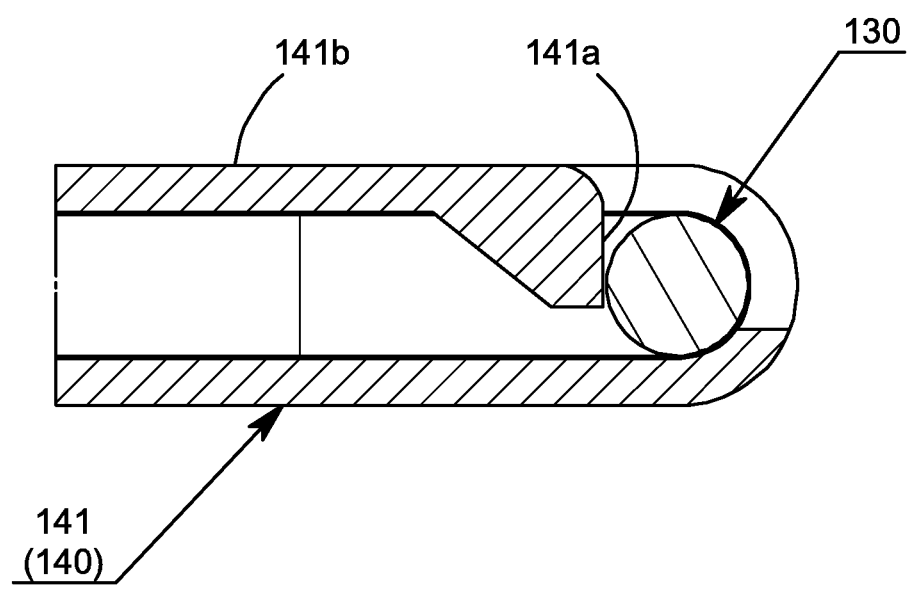
Figure 6A:
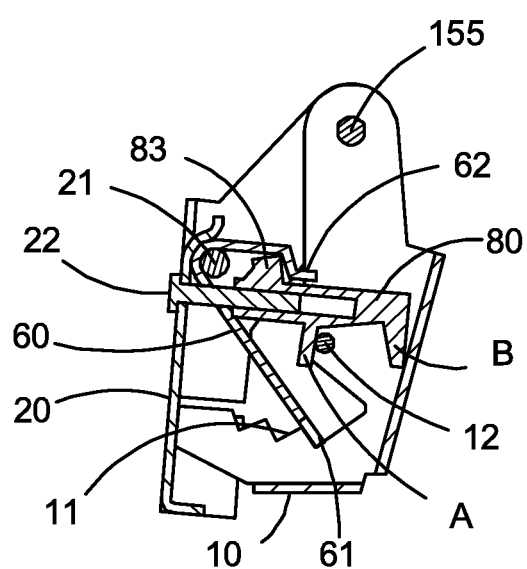
FIG. 6(a), FIG. 6(b), FIG. 6(c), FIG. 6(d), and FIG. 6(e) are explanatory drawings illustrating the operations of the lock switching member in the headrest according to a second embodiment.
Figure 6B:
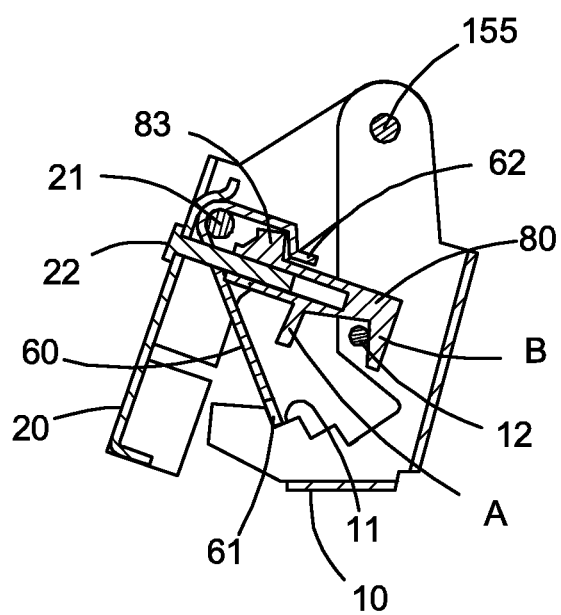
Figure 6C:
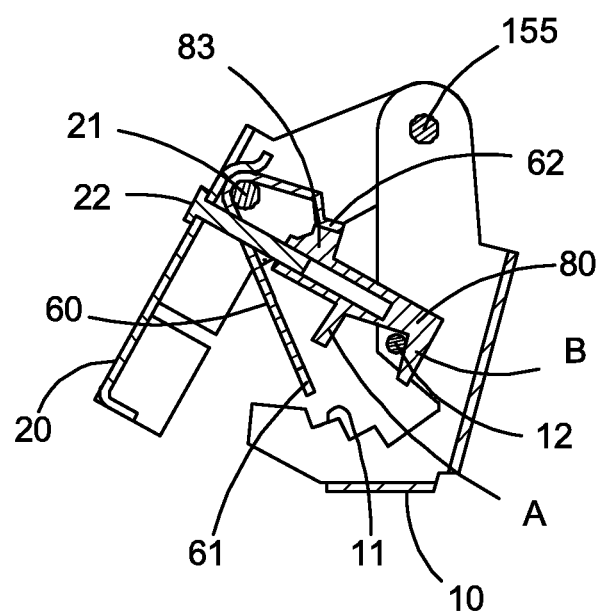
Figure 6D:
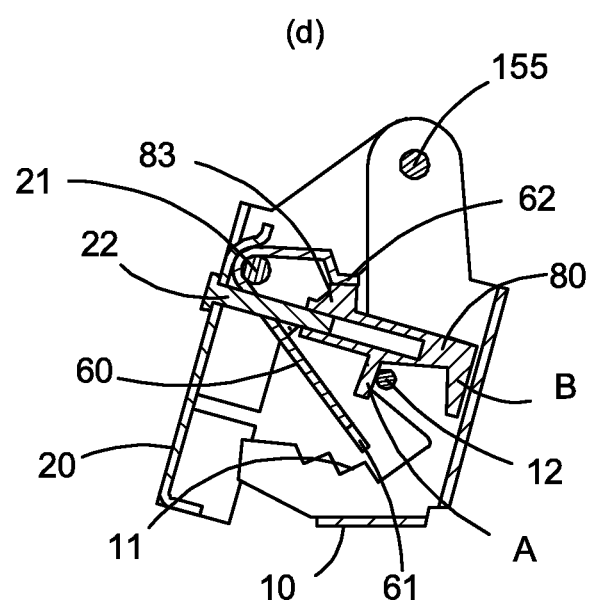
Figure 6E:
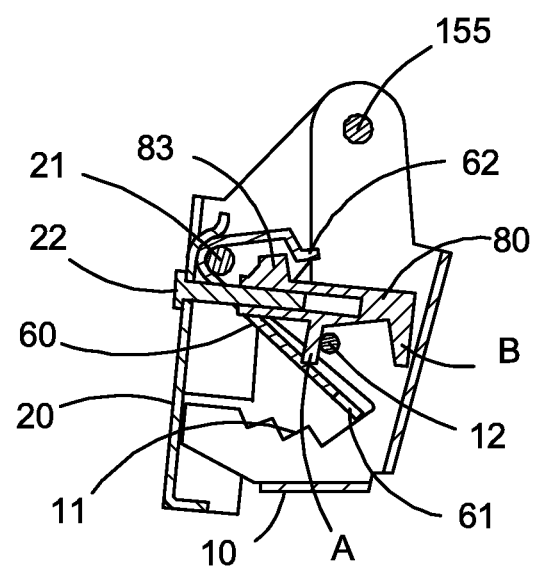

First, a headrest of the first embodiment will be explained hereinafter. FIG. 1 is a front perspective view illustrating a headrest according to a first embodiment in an exploded state. FIG. 2 is a sectional view illustrating a state where the headrest according to the first embodiment is cut with a vertical plane extending through the center thereof. FIG. 3(a), FIG. 3(b), FIG. 3(c), and FIG. 3(d) are explanatory drawings illustrating the operations of a lock switching member in the headrest according to the first embodiment, FIG. 3(a) illustrates a state where the headrest is in an initial position, FIG. 3(b) illustrates a state where the headrest is in a forward adjustment limit position, FIG. 3(c) illustrates a state where the headrest is in a forward rotation limit position, and FIG. 3(d) illustrates a state where the headrest is in a position abutting against a switching abutment portion A. FIG. 4 is a rear perspective view of a resistance member of another mode in the headrest according to the first embodiment. FIG. 5(a) and FIG. 5(b) are diagrams illustrating a headrest frame in a state where a left resin cover is mounted thereon in the headrest according to the first embodiment. FIG. 5(a) illustrates a front view, and FIG. 5(b) illustrates a Z-Z sectional view in FIG. 5(a).

As illustrated in FIG. 1, the headrest according to the first embodiment includes a headrest cushion 110, a headrest stay 120, a headrest frame 130, a first member 10, a second member 20, a third member 30, a fourth member 40, a backward urging member 50, a lock plate 60, a lock urging member 70, a lock switching member 80, a resistance member 90, and a resin cover 140. The headrest has a structure in which the headrest frame 130 is supported in a rotatable state with respect to the headrest stay 120, and the front-back position of the headrest cushion 110 can be adjusted.

The headrest cushion 110 serves as a portion for supporting the head of a seated person and has a structure in which foam is contained in or filled into a cover. The headrest stay 120 has a structure in which upper end portions of a pair of right and left vertical support columns are connected with a horizontal support column, and the right and the left vertical support columns are inserted into right and left headrest supports (not illustrated) forming a pair and mounted on the upper part of the seat back such that the height of the support columns are adjustable. The headrest frame 130 is a shaped product formed of a steel wire material, and has a bridge shape (a shape like a torii in a Japanese shrine) in which upper portions of a pair of right and left support portions extend rightward and leftward. The headrest frame 130 is supported to be movable (rotatable) forward and backward with respect to the headrest stay 120 with a link mechanism described later.

The first member 10, the second member 20, the third member 30, and the fourth member 40 are formed by subjecting steel thin plates to ordinary press working, and form a four-bar link mechanism (also referred to as parallel link mechanism or a four-rod link mechanism) to support the headrest frame 130 in a state of movable forward and backward. A front end portion of the first member 10 is pin-connected (couple a member in a rotatable state with another member, the same is applicable hereinafter) to a lower end portion of the second member 20 with a joint shaft 151, an upper end portion of the second member 20 is pin-connected to a front end portion of the third member 30 with a joint shaft 152, a rear end portion of the third member 30 is pin-connected to an upper end portion of the fourth member 40 with a joint shaft 153, and a lower end portion of the fourth member 40 is pin-connected to a rear end portion of the first member 10 with a joint shaft 154. The first member 10 is integrally coupled with the horizontal support column of the headrest stay 120 (fixing a member in an immovable state on another member, the same is applicable hereinafter), and the third member 30 is integrally coupled with support portions of the headrest frame 130.

The first member 10 includes a pair of right and left vertical wall portions provided with a plurality of engaging teeth 11 on upper edges thereof, a bottom plate portion connecting the pair of the right and the left vertical wall portions, and a switching pin fixed to the vertical wall portions. In the headrest according to the first embodiment, the joint shaft 154 is also configured to function as the switching pin described later, but the switching pin may be provided separately from the joint shaft 154.

The backward urging member 50 is configured to urge the second member 20 against the first member 10 such that the second member 20 is rotated backward. In the headrest according to the first embodiment, a coil spring having one end portion fixed to the first member 10 and the other end portion fixed to the second member 20 is used as the backward urging member 50, another urging member such as a tension spring may be used.

The lock plate 60 is formed by subjecting a thin plate formed of a steel plate to ordinary press working, and the lock plate 60 has an upper end portion supported in a state of being rotatable with respect to the upper end portion (joint shaft 152) of the second member 20. A lower edge of the lock plate 60 includes a pair of right and left engaging projections 61 to be engaged with the engaging teeth 11. In the headrest according to the first embodiment, the right and the left engaging projections 61 are provided in a continuous form. The lock plate 60 includes a switching cam abutted portion 62.

The lock urging member 70 is configured to always urge the lock plate 60 in a lock direction. In the headrest according to the first embodiment, the lock urging member 70 is a coil spring having one end portion fixed to the second member 20 and the other end portion fixed to the lock plate 60, but another urging member such as a tension spring may be used. Together with the lock plate 60 described above, the lock urging member 70 forms a lock mechanism to lock the front-back position (directly, the front-back position of the head rest frame 130) of the headrest cushion 110, and has a function of causing the lock plate 60 to follow the second member 20 until the headrest reaches the forward or the backward adjustment limit position.

The lock switching member 80 is formed of a resin piece supported in a rotatable state with respect to the lower end portion (joint shaft 151) of the second member 20. As illustrated in FIG. 3(a), FIG. 3(b), FIG. 3(c), and FIG. 3(d), the lock switching member 80 is provided with a switching abutment portion A and switching abutment portion B, a first engaging groove 81 and a second engaging groove 82, and a switching cam abutment portion 83. In the headrest according to the first embodiment, the lock switching member 80 is provided with a long hole 84 that extends in an arc shape around the joint shaft 151, such that an upper end internal circumferential portion in the long hole 84 serves as the switching abutment portion A, and a lower end internal circumferential portion in the long hole 84 serves as the switching abutment portion B. The first engaging groove 81 and the second engaging groove 82 are provided in an upward surface of the lock switching member 80. In the headrest according to the first embodiment, the switching cam abutment portion 83 is a corner portion in the upper rear portion of the lock switching member 80.

The resistance member 90 is configured to apply resistance to movement of the lock switching member 80 with respect to the second member 20. In the headrest according to the first embodiment, the resistance member 90 is formed of a bent wire material having an upper portion fixed to the second member 20 and a lower portion acting on the upper portion of the lock switching member 80, but may be formed of a bent plate material as illustrated in FIG. 4. The resistance member 90 forms the lock switching mechanism together with the lock switching member 80 described above. A method for applying resistance with the resistance member 90 is not limited thereto, but frictional resistance between the joint shaft 151 and the lock switching member 80 may be used.

The resin cover 140 is a component to contain the members included in the four-bar link mechanism, the lock mechanism, and the lock switching mechanism described above, together with the headrest frame 130. In the headrest according to the first embodiment, the resin cover 140 includes a left resin cover 141 that is assembled with the headrest frame 130 from the left side, a right resin cover 142 that is assembled with the headrest frame 130 from the right side, and a lower resin cover 143 that is assembled with the headrest frame 130 from the lower side. The resin cover 140 is dividable into the upper right and the upper left parts and the lower part.

This structure facilitates manufacturing and mutually assembling the variable support mechanism, the lock mechanism, and the lock switching mechanism described above in a factory, bringing the assembled intermediate product into another factory, and integrating the intermediate product with the headrest cushion 110 (cover and cushion material). This structure also enhances flexibility in selection of the place for manufacturing the headrest. For example, whether inland or overseas, in the other factory, the manufacturer can adopt either a method of pouring the cushion material such as urethane foam into a space between the internal surface of the cover and the external surface of the resin cover in a state where the intermediate product is contained in the cover forming the headrest cushion 110, or a method of inserting the intermediate product into a hollow portion of the cushion material molded in advance in the internal surface of the cover forming the headrest cushion 110.

In the headrest according to the first embodiment, as illustrated in FIG. 5(a) and FIG. 5(b), the left resin cover 141 includes a stopper hook 141a that abuts against the headrest frame 130 contained therein and prevents the headrest frame 130 from falling off, and a movable piece portion 141b that retracts the stopper hook 141a to a front retracting position when the headrest frame 130 is being contained in the left resin cover 141. The right resin cover 142 (FIG. 1) that is not illustrated in FIG. 5(a) also includes a stopper hook and a movable piece portion that are similar to those of the left resin cover 141. This structure enables reduction in thickness and weight of the resin cover 140 with the strength secured, by securely fixing the left resin cover 141 and the right resin cover 142 in a state of not being disengaged from the headrest frame 130, and using the headrest frame 130 formed of a steel wire material to connect the left resin cover 141 with the right resin cover 142.

1.2 Operations of the Headrest of the First Embodiment

The headrest according to the first embodiment with the structure described above performs operations as follows.

Initial Position

First, as illustrated in FIG. 3(a), when the headrest is in an initial position, the engaging projections 61 of the lock plate 60 are engaged with the rearmost engaging teeth 11. The lock plate 60 in this state is urged in the lock direction by the lock urging member 70, and the engaging projections 61 are engaged with the engaging teeth 11. For this reason, the headrest is prevented from moving backward until unlocking described later from the initial position. In addition, the lower portion of the resistance member 90 is engaged with the first engaging groove 81, and resistance force is applied from the resistance member 90 to the lock switching member 80. The resistance force is applied in a direction of regulating relative rotation of the lock switching member 80 with respect to the second member 20 from the initial position to the forward adjustment limit position described later.

Lock Adjustment Range (from the Initial Position to the Forward Adjustment Limit Position)

When the headrest is moved forward from the initial position of FIG. 3(a), the second member 20 is rotated forward around the joint shaft 151. During the movement, the resistance force acting on the lock switching member 80 from the resistance member 90 regulates relative rotation of the lock switching member 80 with respect to the second member 20, and the switching pin 154 is in a state of being relatively movable inside the long hole 84 without being regulated by the switching abutment portion A and the switching abutment portion B. For this reason, the lock switching member 80 is rotated forward, following the movement of the second member 20. The front-back position of the headrest can be adjusted in stages by changing the engaging teeth 11 to be engaged with the engaging projections 61 to the front ones.

From the Forward Adjustment Limit Position to Forward Rotation Limit Position

When the headrest is moved forward from the initial position illustrated in FIG. 3(a) and engaging projections 61 are engaged with the forefront engaging teeth 11, the headrest is in the forward adjustment limit position illustrated in FIG. 3(b). In this state, the switching pin 154 is in a state of abutting against the switching abutment portion B. Specifically, the lock switching member 80 is prevented from rotating forward beyond the forward adjustment limit position, and the lock switching member 80 maintains the attitude of FIG. 3(b), without following the second member 20, until the headrest reaches the forward rotation limit position described later from the forward adjustment limit position.

When the headrest continues to move forward beyond the forward adjustment limit position of FIG. 3(b), because the second member 20 continues to rotate forward, without accompanying rotation of the lock switching member 80, the lower portion of the resistance member 90 is disengaged forward from the first engaging groove 81. In addition, because the switching cam abutted portion 62 of the lock plate 60 comes to a state of abutting against the switching cam abutment portion 83 of the lock switching member 80, the lock plate 60 is rotated in the unlock direction against the urging force of the lock urging member 70, and engagement between the engaging projections 61 and the engaging teeth 11 is released (unlock).

When the headrest further continues to move forward, the headrest reaches the forward rotation limit position (position where the headrest cannot be moved forward any more) illustrated in FIG. 3(c). In this state, the lower portion of the resistance member 90 comes to a state of being engaging with the second engaging groove 82. For this reason, the resistance force that regulates relative rotation of the lock switching member 80 with respect to the second member 20 starts to act again. Specifically, when the headrest is moved backward from the forward rotation limit position, the lock switching member 80 is also rotated backward together with the second member 20 rotating backward.

In addition, in the forward rotation limit position illustrated in FIG. 3(c), the switching cam abutted portion 62 of the lock plate 60 gets over the switching cam abutment portion 83 forward and is engaged with the first engaging groove 81 in the lock switching member 80. For this reason, when the headrest is moved backward from the forward rotation limit position, the lock plate 60 is also rotated to follow the lock switching member 80 rotating backward, while the unlocked state is maintained. In the movement, the second member 20 is urged to be rotated backward with respect to the first member 10 by the backward urging member 50 (FIG. 1).

From the Position Abutting Against the Switching Abutment Portion A to Initial Position Again When the headrest continues to move backward from the forward rotation limit position of FIG. 3(c), the headrest comes to a position abutting against the switching abutment portion A illustrated in FIG. 3(d). In this state, the switching pin 154 is in a state abutting against the switching abutment portion A. Specifically, the lock switching member 80 is prevented from rotating backward beyond the position abutting against the switching abutment portion A, and the lock switching member 80 maintains the attitude of FIG. 3(d) without following the second member 20, until the headrest reaches the initial position described later from the position abutting against the switching abutment portion A.

When the headrest further continues to move backward beyond the position abutting against the switching abutment portion A of FIG. 3(d), because the second member 20 continues to rotate backward, leaving the lock switching member 80, the lower portion of the resistance member 90 is disengaged backward from the second engaging groove 82. In addition, the switching cam abutted portion 62 of the lock plate 60 is disengaged backward from the switching cam abutment portion 83.

When the headrest further continues to move backward, the headrest returns to the initial position illustrated in FIG. 3(a) again. As the subsequent operations, a series of operations described above is repeated again. The headrest according to the first embodiment enables adjustment of the front-back position of the headrest, with the constituent elements operating as described above, and the headrest has a structure with no necessity for switching the urging direction of the lock urging member 70 between the lock state and the unlock state. This structure prevents occurrence of malfunction such as unlocking due to an impact generated on the headrest when the headrest is in the lock adjustment position.

2. Headrest of Second Embodiment

The following is explanation of the headrest according to the second embodiment. FIG. 6(a), FIG. 6(b), FIG. 6(b), FIG. 6(d), and FIG. 6(e) are explanatory drawings illustrating the operations of the lock switching member 80 in the headrest according to the second embodiment. Although FIG. 6(a), FIG. 6(b), FIG. 6(c), FIG. 6(d), and FIG. 6(e) do not illustrate members such as the lock urging member 70 in the headrest according to the first embodiment, the headrest according to the second embodiment also includes members corresponding to the lock urging member 70 and other components. In the following description, the headrest according to the second embodiment is explained by mainly explaining the portions different from those of the headrest of the first embodiment. Structures substantially similar to those of the headrest of the first embodiment can be adopted for structures that are not specifically referred to for the headrest according to the second embodiment.

In the headrest according to the first embodiment, the mechanism for adjusting the front-back position of the headrest is a four-bar link mechanism (also referred to as parallel link mechanism or four-rod link mechanism) including the first member 10, the second member 20, the third member 30, and the fourth member 40, as illustrated in FIG. 1. By contrast, in the headrest according to the second embodiment, the mechanism includes the first member 10 and the second member 20 that are pin-connected with a joint shaft 155, as illustrated in FIG. 6(a), FIG. 6(b), FIG. 6(c), FIG. 6(d), and FIG. 6(e). The lock plate 60 is supported in a rotatable state with respect to a support shaft 21 fixed to the second member 20. The first member 10 is integrally coupled with the horizontal support column of the headrest stay 120 (FIG. 1), and the second member 20 is integrally coupled with the headrest frame 130 (FIG. 2).

In addition, in the headrest according to the first embodiment, the lock switching member 80 is supported in a rotatable state with respect to the second member 20. By contrast, in the headrest according to the second embodiment, the lock switching member 80 is supported in a state of being fitted onto a guide bar 22 fixed to the second member 20. The guide bar 22 not only supports the lock switching member 80 in a slidable state, but also functions as a resistance member configured to apply resistance to slide of the lock switching member 80 using frictional resistance generated on an external circumferential surface thereof.

Besides, in the headrest according to the first embodiment, the joint shaft 154 that pin-connects the first member 10 with the fourth member 40 is used as the switching pin. By contrast, in the headrest according to the second embodiment, a pin 12 that is integrally coupled with the first member 10 is used as the switching pin. In the headrest according to the second embodiment, the vertical wall portions (only one of the vertical wall portions is illustrated) of the first member 10 has an inverted L shape in side view with a plurality of engaging teeth 11 in a part of internal region.

In addition, in the headrest according to the second embodiment, the lock plate 60 has a bent shape in side view and includes, at right and left side edges in the vicinity of the lower end portion thereof, a pair of right and left engaging projections 61 (only one of the engaging projections is illustrated) to be engaged with the engaging teeth 11 and projecting outward. The lock plate 60 also includes, in the vicinity of the upper end portion thereof, the switching cam abutted portion 62.

In the headrest according to the first embodiment, one end portion and the other end portion of the long hole 84 provided in the lock switching member 80 serve as the switching abutment portion A and the switching abutment portion B, respectively. By contrast, in the headrest according to the second embodiment, a pair of front and rear projections provided downward from the lock switching member 80 serve as the switching abutment portion A and the switching abutment portion B. In addition, in the headrest according to the second embodiment, a projection formed on the upper side of the front end portion of the lock switching member 80 serves as the switching cam abutment portion 83. The lock switching member 80 is configured to temporarily release engagement between the engaging teeth 11 and the engaging projections 61 by rotating the lock plate 60 in the unlock direction.

In the headrest according to the second embodiment described above, as illustrated in FIGS. 6(a) to 6(e), the engaging teeth 11 to be engaged with the engaging projections 61 of the lock plate 60 can be switched in stages from the rearmost teeth to the forefront teeth. In the lock state where the engaging teeth 11 are engaged with the engaging projections 61, the switching abutment portion A is in a free state without being regulated with respect to the switching pin 12. When the headrest is pushed by hand to be adjusted forward, the lock switching member 80 is moved together with the guide bar 22, and the switching abutment portion B abuts against the switching pin 12 in the forward adjustment limit position. When the headrest is operated further forward beyond the forward adjustment limit position, the lock switching member 80 is slid, and the switching cam abutment portion 83 abuts against the switching cam abutted portion 62, to rotate the lock plate 60. In this manner, the engaging teeth 11 are disengaged from the engaging projections 61, and the headrest is unlocked. When the user releases his or her hands from the headrest, the headrest is returned backward by the backward urging member and returns to the original state by sliding of the lock switching member 80.

Like the headrest of the first embodiment, the headrest according to the second embodiment also has the structure with no necessity for switching the urging direction of the lock urging member between the lock state and the unlock state. This structure prevents occurrence of malfunction such as unlocking due to an impact generated on the headrest when the headrest is in the lock adjustment position.

What is claimed is:

1. A headrest in which a headrest frame is rotatably supported with respect to a headrest stay to make a front-back position adjustable, the headrest comprising:
   a first member including a pair of right and left vertical wall portions each having an upper edge provided with a plurality of engaging teeth, a bottom plate portion connecting the pair of right and left vertical wall portions, and a switching pin fixed to the vertical wall portions, the first member being integrally coupled with the headrest stay;
   a second member pin-connected to a third member or integrally coupled with the headrest frame, the third member being integrally coupled with the headrest frame;
   a backward urging member configured to urge the second member to rotate the second member backward;
   a lock plate having a lower edge, the lower edge provided with a pair of right and left engaging projections to be engaged with the engaging teeth, the lock plate being rotatably associated with respect to the second member;
   a lock urging member engaging the lock plate and configured to constantly urge the lock plate in a lock direction, to cause the lock plate to follow the second member;
   a lock switching member having a first engaging groove and a second engaging groove, and the lock switching member being rotatably or slidably attached to the second member; and
   a resistance member configured to apply resistance to movement of the lock switching member with respect to the second member by engaging with the first engaging groove or the second engaging groove, wherein
   the lock switching member is provided with a switching abutment portion A, a switching abutment portion B, and a switching cam abutment portion,
   the lock plate includes a switching cam abutted portion,
   in a lock adjustment range, in a state in which the switching abutment portion A is not regulated by the switching pin, the resistance member is engaged with the first engaging groove to apply resistance to rotation or slide of the lock switching member with respect to the second member, and the lock switching member is moved together with the second member, and
   in rotation further forward beyond a forward adjustment limit position, wherein the switching abutment portion B abuts against the switching pin to regulate rotation or slide of the lock switching member, the second member is rotated forward without accompanying rotation of the lock switching member, while the switching cam abutted portion of the lock plate abuts against and runs onto the switching cam abutment portion of the lock switching member, to change relative positional relation between the second member and the lock plate, and (i) the resistance member is engaged with the second engaging groove, and (ii) the headrest is (1) unlocked by rotation of the lock plate in an unlock direction, (2) returned to an initial position by the backward urging member, and (3) returns to an original state by regulation of movement of the lock switching member.

2. The headrest according to claim 1, further comprising:
   a resin cover containing, together with the headrest frame, a mechanism member including the first member, the second member, the backward urging member, the lock plate, the lock urging member, and the lock switching member, wherein
   the resin cover is dividable and includes a left resin cover assembled with the headrest frame from a left side, and a right resin cover assembled with the headrest frame from a right side,
   the headrest frame is formed of a steel wire material in a bridge shape having right and left support portions and an upper portion extending rightward and leftward, and integrally coupled with a rotating side portion at the support portions,
   the left resin cover and the right resin cover covering the mechanism member are integrally coupled in a form of wrapping the headrest frame, and
   at least one of the left resin cover and the right resin cover includes a stopper hook abutting against the headrest frame contained therein from the left or right to prevent the headrest frame from falling off.

3. The headrest according to claim 1, further comprising:
   a resin cover containing, together with the headrest frame, the first member, the second member, the backward urging member, the lock plate, the lock urging member, and the lock switching member;
   a cover forming an outer surface of the headrest; and
   a cushion material disposed between an external surface of the resin cover and an internal surface of the cover, wherein
   the resin cover is dividable and includes a left resin cover assembled with the headrest frame from a left side, a right resin cover assembled with the headrest frame from a right side, and a lower resin cover assembled with the headrest frame from a lower side.

* * * * *